United States Patent [19]

Ewers

[11] 3,969,871
[45] July 20, 1976

[54] FASTENING CONSTRUCTION FOR PLAYGROUND EQUIPMENT

[75] Inventor: Ronald L. Ewers, Litchfield, Mich.

[73] Assignee: The Toro Company, Minneapolis, Minn.

[22] Filed: Feb. 10, 1975

[21] Appl. No.: 548,563

[52] U.S. Cl.................................. 52/721; 272/109; 403/195
[51] Int. Cl.²...................... E04C 3/30; A63B 17/04
[58] Field of Search................. 52/721, 726, 753 F; 403/174, 178, 201, 256, 195; 46/221–223; 272/56.5, 57, 60 R

[56] References Cited

UNITED STATES PATENTS

| | | | |
|---|---|---|---|
| 2,035,488 | 3/1936 | McArthur | 52/721 |
| 2,035,489 | 3/1936 | McArthur | 403/174 |
| 2,242,427 | 5/1941 | Heanue | 403/201 |
| 2,874,812 | 2/1959 | Clevett | 52/726 |
| 3,814,416 | 6/1974 | Munger et al. | 272/60 R |

FOREIGN PATENTS OR APPLICATIONS

| | | | |
|---|---|---|---|
| 937,246 | 3/1948 | France | 52/726 |
| 433,314 | 8/1935 | United Kingdom | 52/753 T |
| 545,887 | 6/1942 | United Kingdom | 403/178 |

*Primary Examiner*—Ernest R. Purser
*Assistant Examiner*—James L. Ridgill, Jr.
*Attorney, Agent, or Firm*—Merchant, Gould, Smith, Edell, Welter & Schmidt

[57] ABSTRACT

A basic unit of construction for use in playground equipment and the like, in which timbers are to be interconnected with tubes of smaller diameter. Each timber is cross bored and counter bored at each side to give recesses with substantially flat and parallel bottoms, and beneficial compression is applied to the posts by means which may also serve to grip the tubes, and which are sized to fit the bottoms of the recesses rather than the cross bores, thus improving the transfer of force from the tube to the timber and minimizing any splitting effect exercised on the timbers. The invention includes a special fitting for applying this principle where timbers are to be connected directly to one another either in parallel or in orthogonal relationship.

6 Claims, 12 Drawing Figures

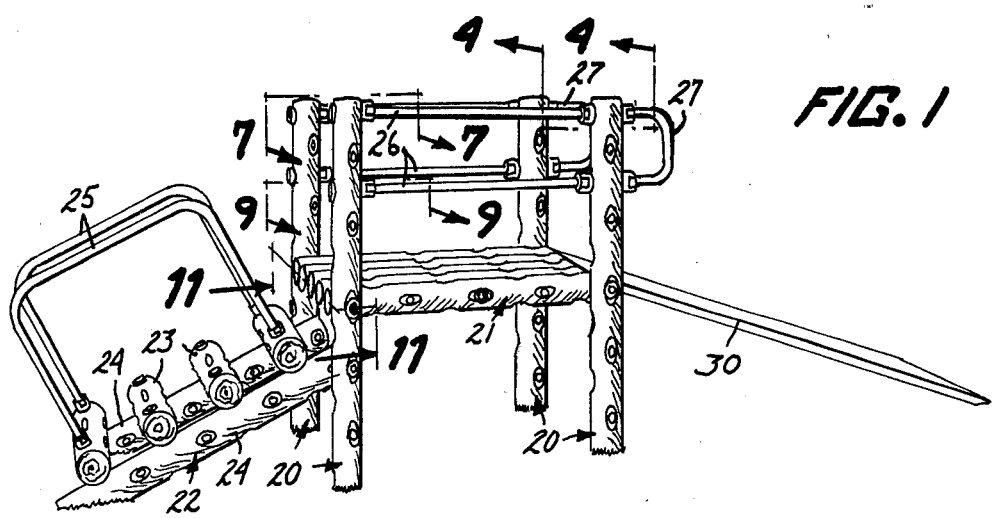
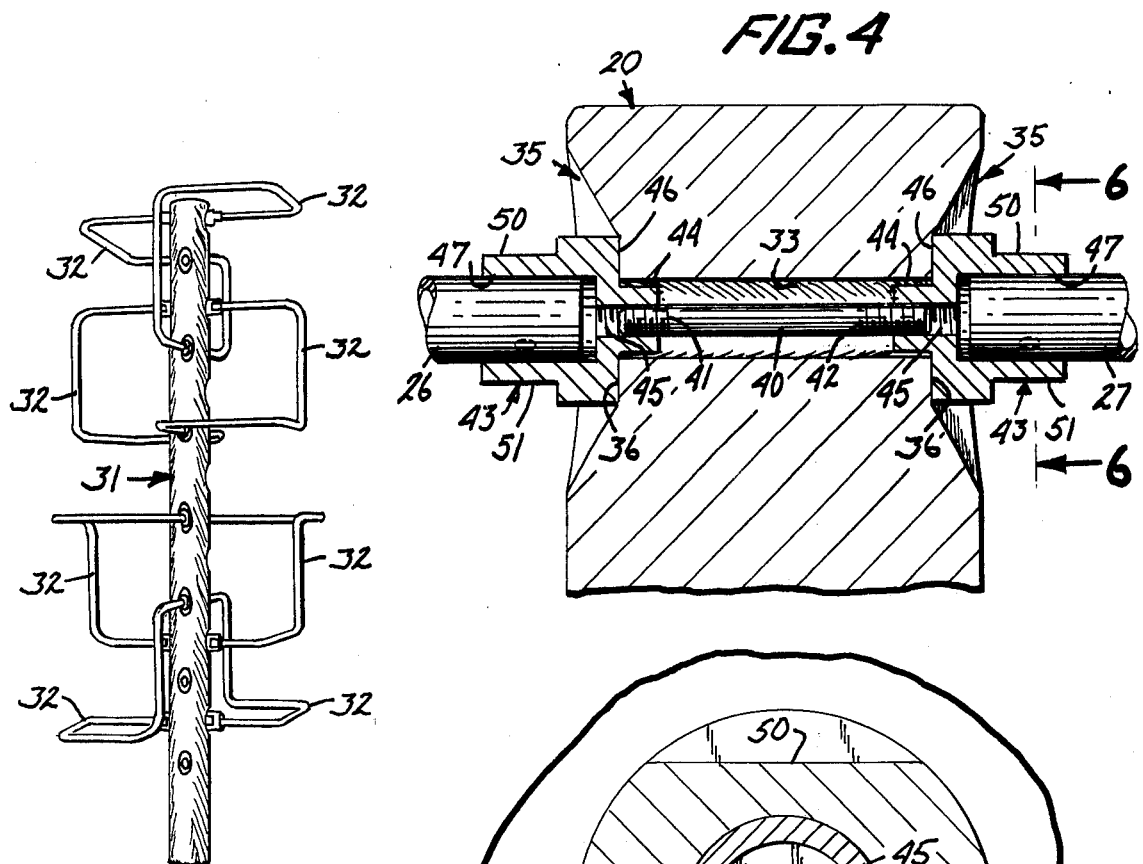
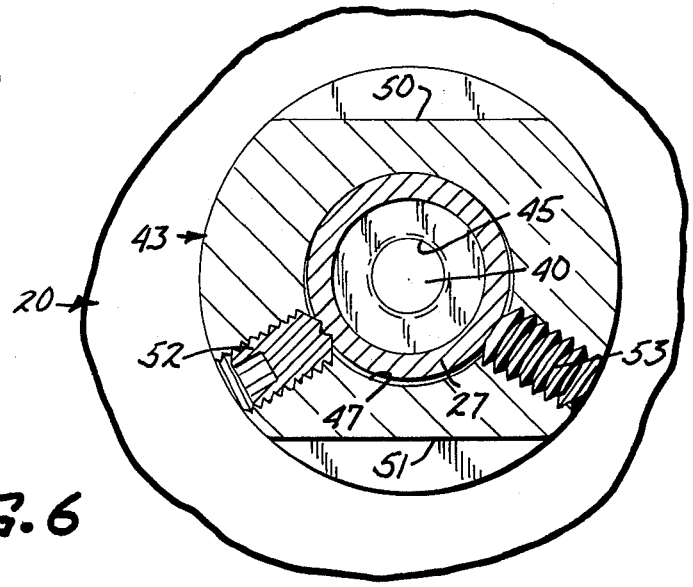

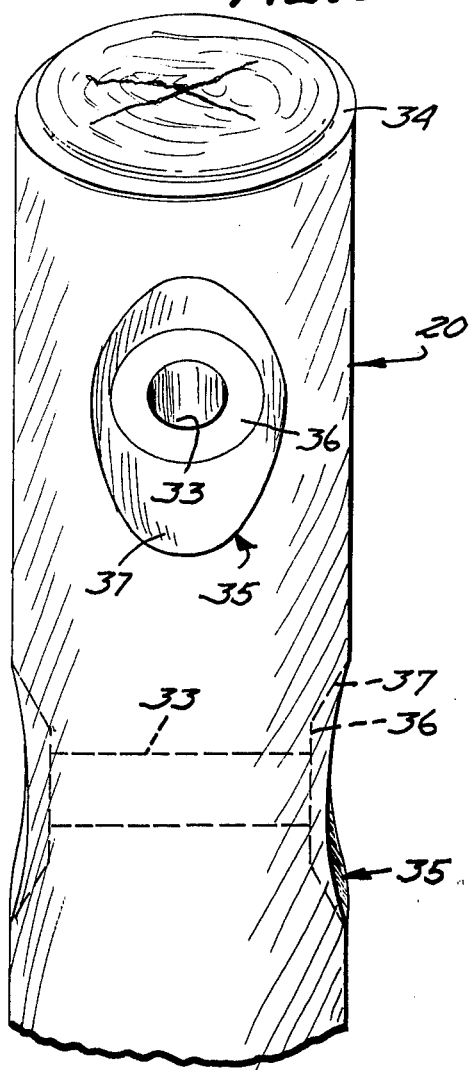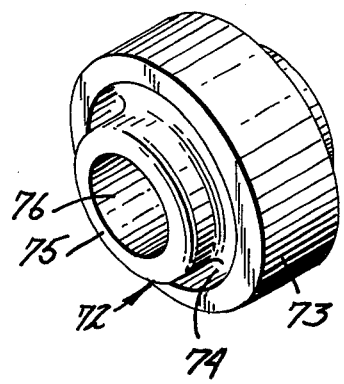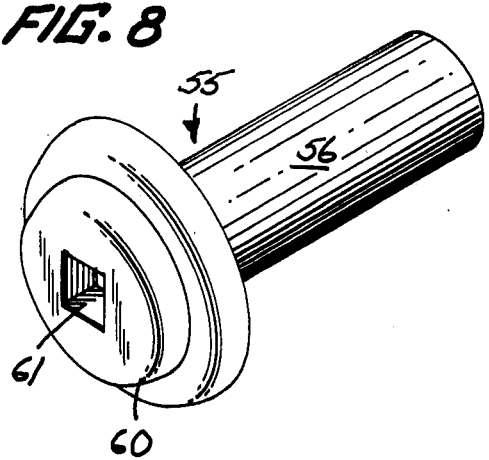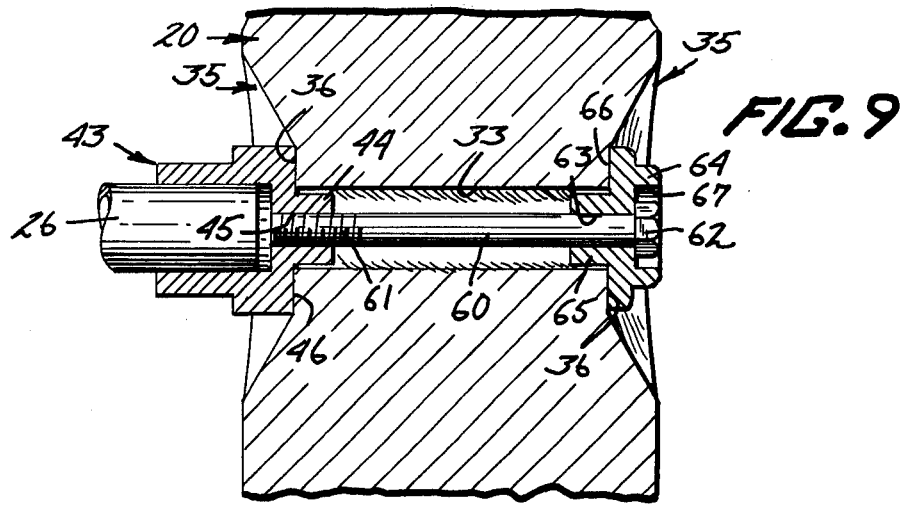

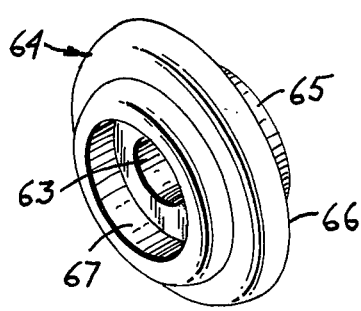
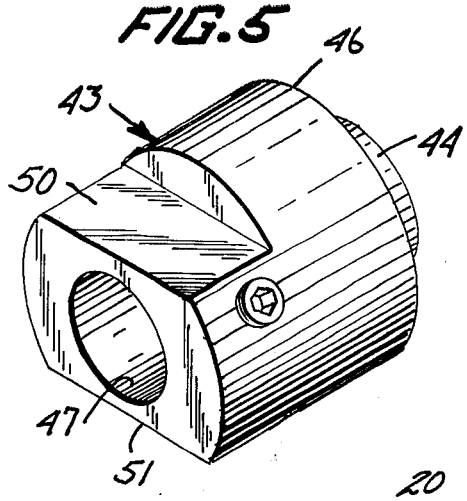
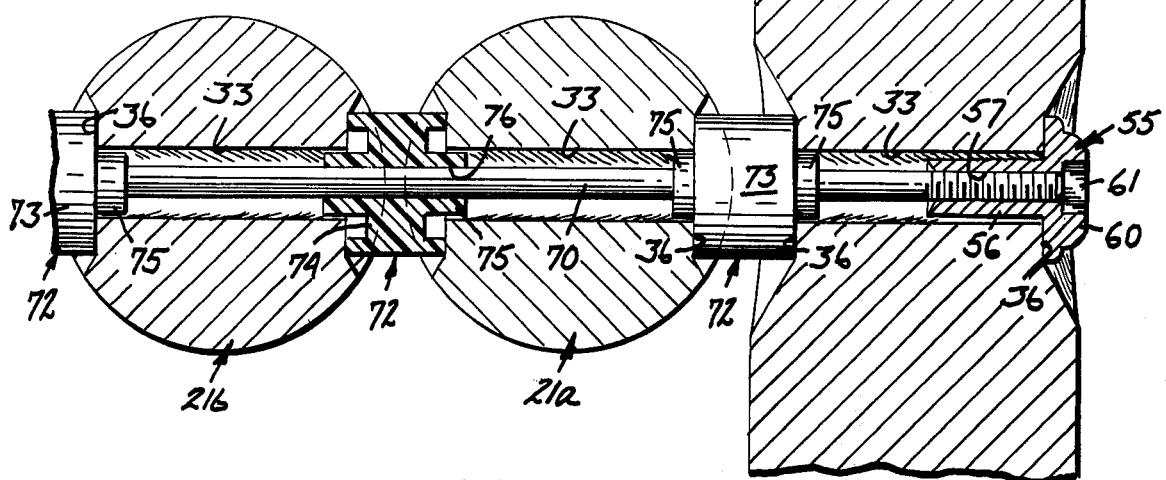
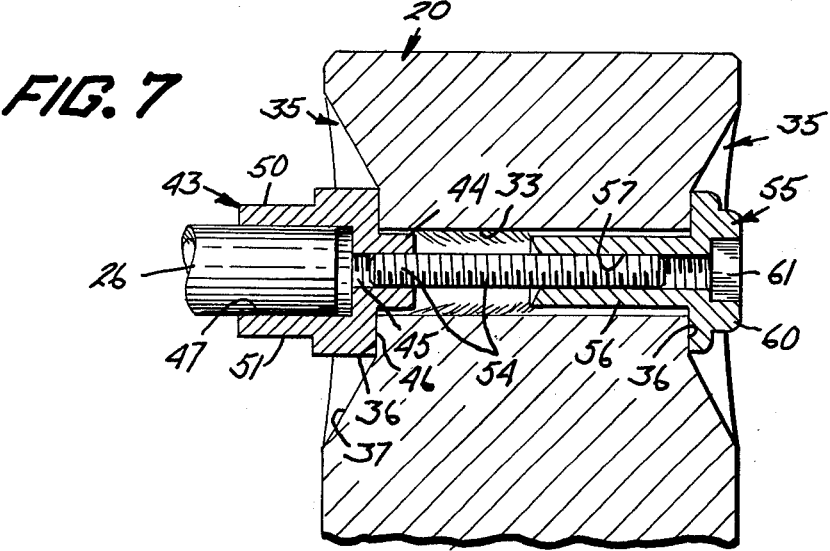

FASTENING CONSTRUCTION FOR PLAYGROUND EQUIPMENT

BACKGROUND OF THE INVENTION

This invention relates to the general field of construction of objects intended to remain exposed to the elements such as playground equipment, rustic structures, and the like. The structures are typically assemblies of wooden posts or poles, hereinafter called "timbers", and metal bar members, usually tubular, hereinafter called "tubes", and a very common problem is to interconnect such members inexpensively, conveniently, and in a manner which is not likely to cause damage to the timbers, such as causing them to split. Playground equipment particularly is subject to severe use, and must be extremely rigid and durable. No satisfactory way has been found for interconnecting the timbers and tubes by attachment to the pole surfaces, and it has become customary to cross bore the timbers so that they may be traversed by the tubes, which are thereafter secured to them. Arrangements of this sort are taught in Munger, et al, U.S. Pat. No. 3,814,416, and in the copending patent application of John M. Beattie, Ser. No. 433,612, filed Jan. 8, 1974, now U.S. Pat. No. 3,893,776, issued July 8, 1975 and assigned to the assignee of the present application.

As taught in the co-pending application, there is much advantage to be gained in the use of interconnecting fittings which provide a beneficial compression of the timbers in the area of the connection. It is also important, however, that fittings be producible at low cost, and usable in the field easily and efficiently.

SUMMARY OF THE INVENTION

I have invented a new method of assembling structures for playground and like uses, and new fittings for use in practicing my invention. I cross bore the timber, counter bore it to form recessed opposed flat surfaces surrounding the cross bore, install in the bore fittings which place the timber under beneficial compression in the connection area, and secure the tubes to the fittings. By my system, the cross bores may be of smaller diameter than the tubes, which do not pass through the timbers, thus reducing the timber weakening caused by the cross bores. The fittings are inexpensive, easily producible, convenient to install, and transfer forces from the tubes to the timbers over a relatively large area of the latter in a manner that does not tend to cause splitting or hole enlargement.

My invention may be used to secure timbers to other timbers, either orthogonally or in parallel relation, and I also provide special means for insuring the presence of adequate spacing between timbers so interconnected, to minimizing the accumulation of moisture or dirt which accelerates the deterioration of timbers exposed to the elements.

Various advantages and features of novelty which characterize my invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there are illustrated and described certain preferred embodiments of the invention.

BRIEF DESCRIPTION OF THE DRAWING

In the drawing, FIGS. 1 and 2 show playground structures embodying my invention, FIG. 3 is a view showing how a timber is prepared according to my invention for use in the playground structure, FIG. 4 is a sectional view along the line 4—4 of FIG. 1, to a larger scale, FIG. 5 is a perspective view of a fitting used in FIG. 4, FIG. 6 is a sectional view along the line 6—6 of FIG. 4, to a different scale, FIG. 7 is a sectional view along the line 7—7 of FIG. 1, to a larger scale, FIG. 8 is a perspective view of a fitting used in FIG. 7, FIG. 9 is a sectional view along the line 9—9 of FIG. 1, showing a modification of the invention, FIG. 10 is a perspective view of a fitting used in FIG. 9, FIG. 11 is a fragmentary section along the line 11—11 of FIG. 1, to a larger scale, and FIG. 12 is a perspective view of a fitting used in FIG. 11.

DESCRIPTION OF THE PREFERRED EMBODIMENT

FIG. 1 shows a playground structure embodying my invention. A plurality of timbers 20 set in the ground, support a deck 21 made of parallel timbers. A staircase 22 comprises timber treads 23 and timber stringers 24 resting on the ground at first ends and secured to timbers 20 at the other end. The staircase has tube handrails 25, the platform has tube railings 26, and a pair of tube hand grips 27 extend beyond railing 26 at the top of a slide 30.

A second structure embodying my invention is shown in FIG. 2 to comprises a single timber 31 set in the ground. Secured to the timber at opposite ends are a plurality of climber elements 32, preferably of identical configuration. These members are of tubing have four successive right angle bends extending first horizontally from the timber, bending by 90° horizontally twice in the same direction, then vertically, and then horizontally back to the timber. They are usable in either of two mutually inverted orientations.

For convenience, members 25, 26, 27, and 32 may be referred to generally, by reason of their common gymnastic function, as bar members.

In preparation for use in structures such as those just described, I prepare the timbers as is shown in FIG. 3 by cross boring and counter boring. The cross bores 33 are successively at right angles to one another at regular invervals along the timbers, which can if desired be chamfered as at 34 to finish their ends. Unless the timbers are squared, each end of each cross bore is counter bored to give a recess 35 having a flat surface 36, normal to the axis of the cross bore, joined to a conical bevel 37 extending to the surface of the timber. The cross bores should be of substantial size, to freely pass tension elements, described below, of adequate strength, but need not be large enough to pass the tubes.

FIG. 4 shows how tubes 26 and 27 are secured to timber 20. A tension member 40 having threaded ends 41, 42 is passed through cross bore 33. Onto each end of member 40 is screwed a fitting 43 (FIGS. 5 and 6)

having a central boss 44 internally threaded at 45, and extending from a flat surface 46 sized to fit surface 36 of the counter bore. The end of the fitting opposite boss 44 is recessed at 47 to receive a tube, all of which are of standard diameter, and is provided with two opposite flat faces 50, 51, to receive a wrench or other tool for tightening the fitting on the tension member. A pair of set screws 52, 53 are provided to secure tubes 26 and 27 in fittings 43. Bosses 44 are preferably of smaller diameter than bore 33.

The same mode of connection may be used in securing members 32 in timbers 31.

When it is not required that a tube extend in both directions from a timber, alternative constructions are available. FIG. 7 is a section taken along the line 7—7 of FIG. 1, and shows the timber to be prepared as described. In this modification, a tension member 54 is shown threaded for its entire length, and a fitting 43 is screwed onto one end of the member. To the other end is screwed a fitting 55 having a central boss 56, preferably of less diameter than cross bore 33, which is internally threaded at 57 to engage member 54. See FIG. 8. The other end of fitting 55 has a head 60 sized to fit surface 36 of the counter bore, and is provided with a recess 61 to fit a polygonal driving tool.

A modification of this arrangement is shown in FIG. 9. Here the tension member 60 is a standard bolt threaded at one end 61 to engage fittings 43, and having the usual hexagonal head 62 at its other end. The bolt passes through a central hole 63 in a fitting 64, also shown in FIG. 10, having a central boss 65 smaller than cross bore 33, a shoulder 66 sized to fit surface 36 of the counter bore, and a recess 67 large enough to receive head 62 with a wrench applied thereto.

It will be obvious that the structures of FIGS. 4–9 provide means for holding tube 26 securely to timber 20, while at the same time providing beneficial compression to the tubes in the area of the connection.

A slightly different problem arises when two round timbers are to be joined together, either in parallel or orthogonal relation. In the former, the timbers would really contact, in the absence of compressive distortion, only at the four points comprising the points of contact of the conical counter bore surfaces of the two timbers. In the latter, the timbers would really contact only along a line of tangency of the two cylindrical surfaces. Neither of these relationships represents good engineering practice, and the latter, moreover, results in elongated troughs which quickly fill with detritus and hold moisture, hastening the decay of the timbers. To avoid these defects, I have invented a further fitting which acts to maintain spacing between timbers in either configuration, improving the structural strength of the assembly and providing a space for detritus to fall between the timbers, rather than gathering upon them.

In FIG. 11, which is a horizontal fragmentary view in section along the line 11—11 of FIG. 1, to a larger scale, a vertical timber is shown at 20 and two platform timbers are shown at 21a and 21b. A tension member 70 extends through cross bores 33 in the timbers and is prevented from being drawn to the right, as seen in FIG. 11, by means, not shown, such as the arrangements illustrated in FIGS. 7 and 9.

Between timbers 21a and 21b, and also between timbers 21a and timber 20, are installed spacer fittings 72. As best shown in FIG. 12, such a spacer fitting comprises a cylindrical rim 73 sized to fit the recesses 36 in the counter bores of the adjacent timbers. Connected to the rim by a web 74 is a central hub 75 of less outside diameter than the counter bores, extending axially beyond rim 73 in both directions to be received in the counter bores, and centrally bored at 76 to snugly pass tension member 70. The axial width of ring 73 is greater than twice the depth of a flat recess 36 below the periphery of a timber, so that when the fittings on tension members 70 are tightened, timber-to-timber contact does not occur, each pole making lateral contact with the rim of a spacer fitting instead. Contact area is thus at all locations satisfactorily large, and spacing between parallel timbers is satisfactorily maintained.

From the foregoing it will be evident that I have invented a new method and structure for use in constructing playground equipment and the like, which provides beneficial compression to timbers at the points where they are to be joined by tubes, increases the rigidity of the resulting structure, is inexpensive to manufacture, and quick and easy to install in the field without tending to weaken the timbers, and increases contact area to give stable structures while maintaining desired spacings to give the structures added durability.

Numerous characteristics and advantages of my invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

What is claimed is;

1. A basic unit of construction for use in playground equipment of the type constructed from interfitting tubular members and wooden timbers, comprising:

a wooden timber having a cross bore extending therethrough, said timber having a pair of recesses therein at opposite ends of said cross bore, said recesses each having a bottom comprising a substantially flat surface, said surfaces being parallel to one another;

a threaded tension member, said member having a diameter substantially less than the diameter of said cross bore and extending freely through said bore;

a pair of fittings, one each engaging said tension member at opposite ends thereof, at least one of said fittings being threadedly adjustable along said tension member, with said fittings each contacting an associated one of said flat surfaces so that said timber is placed in compression in the vicinity of said cross bore by threaded rotation of said fitting; at least one of said fittings having a recess therein for receipt of a tubular member;

a tubular member received within said fitting recess; and means carried by said recessed fitting for securing one end of said tubular member to said fitting within said recess.

2. The structure of claim 1 in which the threaded tension member is headed at one end, and one of said fittings is traversed by said tension member and has an inner flat surface, to engage said timber surface, and an outer surface with a central recess to freely accomodate the head of said tension member.

3. The structure of claim 1 in which the threaded tension member is headed at one end, and one of said fittings is traversed by said tension member and has an inner flat surface, sized to fit said recess and engage said timber surface, and an outer surface with a central recess to freely accomodate the head of said tension member.

4. The structure of claim 1 in which the tension member is threaded at both ends in the same sense, and one of said fittings has an inner flat surface for engaging one of said bottoms, a threaded boss projecting inwardly from said inner surface to engage said tension member, and an outer surface configured to engage a driving tool.

5. The structure of claim 1 in which the tension member is threaded at both ends in the same sense, and one of said fittings has an inner flat surface sized to fit one of said recesses in said wooden timber for engaging the flat surface thereof, a threaded boss projecting inwardly from said inner surface to engage said tension member, and an outer surface configured to engage a driving tool.

6. The structure of claim 1 in which said fittings are dimensioned to fit said bottoms of said recesses, to prevent lateral displacement of said tension member in said cross bore.

* * * * *